(12) United States Patent
Balian et al.

(10) Patent No.: US 6,776,923 B2
(45) Date of Patent: Aug. 17, 2004

(54) SELF-ADHERING THERMAL INTERFACE MATERIAL

(75) Inventors: Charles Balian, Guilford, CT (US); Stephen G. Wojtowicz, Shelton, CT (US); Steven E. Bergerson, Milford, CT (US)

(73) Assignee: Saint-Gobain Performance Plastics Corporation, Wayne, NJ (US)

( * ) Notice: Subject to any disclaimer, the term of this patent is extended or adjusted under 35 U.S.C. 154(b) by 246 days.

(21) Appl. No.: 10/165,436

(22) Filed: Jun. 7, 2002

(65) Prior Publication Data

US 2003/0226997 A1 Dec. 11, 2003

(51) Int. Cl.$^7$ ................................................ C09K 5/00
(52) U.S. Cl. ......................................... 252/71; 252/70
(58) Field of Search .................................... 252/71, 70

(56) References Cited

U.S. PATENT DOCUMENTS

| | | | |
|---|---|---|---|
| 4,869,954 A | 9/1989 | Squitieri | 428/283 |
| 5,194,480 A | 3/1993 | Block et al. | 524/404 |
| 5,545,473 A | 8/1996 | Ameen et al. | 428/283 |
| 5,591,034 A | 1/1997 | Ameen et al. | 439/91 |
| 5,844,309 A | 12/1998 | Takigawa et al. | 257/701 |
| 6,054,198 A | 4/2000 | Bunyan et al. | 428/40.5 |
| 6,096,414 A | 8/2000 | Young | 428/220 |
| 6,197,859 B1 | 3/2001 | Green et al. | 524/270 |

*Primary Examiner*—Hoa Van Le
(74) *Attorney, Agent, or Firm*—Mike W. Crosby

(57) ABSTRACT

Disclosed is a thermal interface composition which undergoes a viscoelastic change at microprocessor operating temperatures to transfer heat generated by a heat source to a heat sink, the composition comprising:

(A) a viscoelastic composition which softens at about the operating temperature of the heat source, the viscoelastic composition comprising:
  (1) a thermoplastic elastomer,
  (2) a compatible hydrocarbon oil, and
  (3) a tackifying resin;
(B) a dispersing agent; and
(C) a thermally conductive filler dispersed within the viscoelastic composition.

Also disclosed is a method for making the thermal interface composition.

23 Claims, No Drawings

SELF-ADHERING THERMAL INTERFACE MATERIAL

FIELD OF THE INVENTION

The present invention relates to thermally conductive materials and, more particularly, to thermally conductive interface material for heat generating devices, such as microprocessor power supply assemblies, that facilitate heat transfer from the heat generating device to a heat sink.

BACKGROUND OF THE INVENTION

With increasing market pressure for smaller, faster, and more sophisticated end products using integrated circuits, the electronics industry has responded by developing large scale integrated circuit devices which occupy less volume, yet operate at high current densities. Such devices generate considerable heat during operation. If the heat is not adequately removed, the increased temperatures generated by the device will result in its failure.

A heat sink is commonly used to transfer the heat away from the device. The heat sink generally includes a plate or body formed from a conductive metal, which is maintained in thermal contact with the device for dissipating heat in an efficient manner. Fins optionally protrude from the plate for providing an increased surface area for heat dissipation to the surrounding environment.

The current industry technique for providing thermal contact between heat-generating electronic device and a heat sink is to interpose a thermal interface material between the two, which facilitates heat transfer from the device to the heat sink.

One method is to apply a ceramic filled thermal grease, which is typically silicone-based, between the heat sink and the power supply. Thermal greases provide excellent thermal properties, but require an extensive assembly process with high manufacturing cost. The product is usually applied by hand from a syringe or with an aluminum carrier. This process is labor intensive and slow and does not lend itself to automation.

Another method for providing a conductive interface includes the use of thermally-conductive wax compounds. These, however, are generally brittle at ambient temperatures and are easily chipped off, resulting in a high thermal resistance. The low viscosity of the wax at operating temperature causes it to flow out, resulting in a high thermal resistance. Further, because of the brittle nature of the wax compounds, they are difficult to manufacture and apply to a heat sink.

Thermally conductive silicone rubbers have also been used for conductive interfaces. Although soft and pliable, their silicone rubber requires relatively high pressure and a long warm up to attain a low thermal resistance. The rubber has poor flow characteristics, which results in a low thermal conduction when there is a mismatch of flatness between the heat sink and the heat producing device. Differences in the thermal coefficient of expansion between the silicone rubber and the heat sink can result in high thermal resistance during temperature cycling. These effects lead to a poor thermal conductivity from the heat-producing device to the heat sink. Still other thermal interfaces employ polymeric thermally-conductive cure-in-place compounds. These compounds are generally rigid after cure. They have a poor reliability because of a difference between the material and the heat sink, causing cracks and failure during temperature cycling. The polymeric materials are labor intensive to apply and require long cure times.

The present invention provides for a new and improved thermal interface which overcomes the above-referenced problems and other problems as well.

SUMMARY OF THE INVENTION

In accordance with the present invention, there is provided a novel thermal interface composition which undergoes a viscoelastic change at microprocessor operating temperatures to transfer heat generated by a heat source to a heat sink, the composition comprising:

(A) a viscoelastic composition which melts at a temperature within the range of the the operating temperature of the heat source, the viscoelastic composition comprising:
 (1) a thermoplastic elastomer,
 (2) an oil compatible with the elastomer, and
 (3) a tackifying resin;
(B) a dispersing agent; and
(C) a thermally conductive filler dispersed within the viscoelastic composition.

The invention includes a method for making the novel thermal interface composition.

DETAILED DESCRIPTION OF THE INVENTION (A) The Viscoelastic Composition

The viscoelastic composition in accordance with one embodiment of the invention is a material that melts at a temperature within the range of the the operating temperature of the heat source. The composition comprises (1) a thermoplastic elastomer,
(2) an oil compatible with the elastomer, and
(3) a tackifying resin.

The thermoplastic elastomer (A)(1) is a styrene-alkylene block copolymer. Block copolymers have been produced which comprise primarily those having a general structure of a triblock A-B-A wherein the polymer blocks A comprise thermoplastic polymer blocks of alkenyl arenes such as polystyrene, while polymer blocks B are alkylene blocks comprising a polymer of ethylene, propylene, 1-butene, 2-butene, isobutylene, butadiene, isoprene or mixtures thereof.

The styrene-alkylene-styrene triblock copolymers having utility in this invention comprise polystyrene end blocks chemically bound to an elastomeric polyalkylene mid-block. Depending on the end use, the elastomeric polyalkylene mid-block preferably is poly(butadiene), poly(isoprene) or poly(ethylene-butylene) to give poly(styrene-butadiene-styrene), poly(styrene-isoprene-styrene) and poly(styrene-ethylene-butylene-styrene) triblock copolymers, resp. Since polystyrene generally is incompatible with polyalkylenes, the polystyrene end blocks tend to agglomerate and form a separate domain. However these domains are limited in mobility by being chemically fastened to the polyalkylenes such that the polystyrene domains are a discrete phase within a polyalkylene continuous phase. Typically, the polystyrene portion has an average molecular weight of 2000 to 100,000 and a glass transition temperature above 25° C. while the polyalkylene portion has an average molecular weight of 25,000 to 1,000,000 and a glass transition temperature below 10° C. Useful polymers where the midblock is isoprene are described in U.S. Pat. No. 3,265,765 incorporated herein by reference. Particularly useful triblock copolymers containing ethylene-butylene generally have Brookfield solution viscosities of about 360 centipoise measured at 25° C. in cyclohexane and glass transition temperature of about −55° C. for the ethylene-butylene portion and about 95° C. for the polystyrene portion. A preferred thermoplastic elastomer (A)(1) is a poly(styrene-ethylene-butylene-styrene) triblock copolymer. Typically, the weight ratio of styrene end block to ethylene-butylene center block of the triblock polymer is from 10:90 to 40:60, preferably from 20:80 to 35:65 and most preferably from 25:75 to 30:70.

Representative polystyrene/polyalkylene copolymers are marketed under the Kraton™ name by Kraton Polymers, an affiliate of Ripplewood Holdings, LLC. Kraton 1107 is a poly(styrene-isoprene-styrene) triblock copolymer with an approximate intrinsic viscosity of 1.13 and a styrene:isoprene ratio of 14:86. Kraton 1650 is a poly(styrene-ethylene-butylene-styrene) triblock copolymer having a styrene:ethylene-butylene ratio of 28:72 and a Brookfield viscosity at 15% solids in cyclohexane of 360 centipoise at 25° C. Kraton 1651 is a poly(styrene-ethylene-butylene-styrene) triblock copolymer having a styrene:ethylene-butylene ratio of 33:67. Kraton 1652 is a similar poly(styrene-ethylene-butylene-styrene) triblock copolymer, having a styrene:ethylene-butylene ratio of 29:71. These copolymer systems are described in J. Polymer Sci. Part C, No. 26, pp. 37–57 (1969) incorporated herein by reference.

The compatible hydrocarbon oil (A)(2) comprises a mineral oil, a polyalphaolefin, or mixtures thereof. By the term "compatible" it is meant that the hydrocarbon oil is miscible, i.e., soluble in both the thermoplastic elastomer (A)(1) and the tackifying resin (A)(3).

The mineral oils having utility in this invention comprise paraffinic oils, naphthenic oils, aromatic oil, or mixtures thereof A representative sample of mineral oils include liquid petroleum oils, hydrotreated liquid petroleum oils, solvent-treated mineral oils, acid treated mineral oils, naphtha or Stoddard solvent.

The mineral oils are based in particular on hydrocarbon compounds. The mineral oils are unrefined, refined and rerefined oils as well as mixtures of each with the other. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be unrefined oil.

Refined oils are similar to the unrefined oils except they have been further treated in one or more purification steps to improve one or more properties. Many such purification techniques are known to those skilled in the art such as solvent extraction, secondary distillation, hydrotreating, hydrocracking, acid or base extraction, filtration, percolation, etc.

Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products. Most preferably, the oil used herein is a petroleum derived oil.

In a preferred embodiment, the hydrocarbon oil (A)(2) is a mineral oil comprising a paraffinic oil and an aromatic oil wherein the ratio of paraffinic oil:aromatic oil is from 30–70:70–30, and in a most preferred embodiment from 40–60:60–40.

The polyalphaolefins utilized in this invention are the poly (1-alkenes) wherein the alkene is at least a butene up to about tetracosene. An illustrative but non-exhaustive list includes poly (1-hexenes), poly (1-octenes), poly (1-decenes) and poly (1-dodecenes) and mixtures thereof.

An especially preferred hydrocarbon oil is Shellflex® 371 available from Shell Oil Corporation. Shellflex 371 has an aromatic composition of 14 percent and a saturated composition of 86 percent.

The tackifying (tackifier) resins (A)(3), are known to those skilled in the art and have for example been described in detail in the Handbook of Pressure Sensitive Adhesive Technology, $2^{nd}$ edition, 1989, edited by Donatas Satas, pages 527 to 544.

The tackifying resins which are used in the viscoelastic composition of the instant invention are those which extend the adhesive properties and improve the specific adhesion of the thermoplastic elastomer. As used herein, the term "tackifying resin" comprises:

(a) natural and modified rosin such as, for example, gum rosin, wood rosin, tall-oil rosin, distilled rosin, hydrogenated rosin, dimerized rosin and polymerized rosin;

(b) glycerol and pentaerythritol esters of natural and modified rosins, such as, for example, the glycerol ester of pale wood rosin, the glycerol ester of hydrogenated rosin, the glycerol ester of polymerized rosin, the pentaerythritol ester of pale wood rosin, the pentaerythritol ester of hydrogenated rosin, the pentaerythritol ester of tall oil rosin and the phenolic modified pentaerythritol ester of rosin;

(c) polyterpene resins having a softening point, as determined by ASTM method E28-58T, of from about 60° C. to 140° C., the latter polyterpene resins generally resulting from the polymerization of terpene hydrocarbons, such as the mono-terpene known as pinene, in the presence of Friedel-Crafts catalysts at moderately low temperatures; also included are the hydrogenated polyterpene resins;

(d) copolymers and terpolymers of natural terpenes, e.g. styrene/terpene, alpha-methyl styrene/terpene and vinyl toluene/terpene;

(e) phenolic-modified terpene resins such as, for example, the resin product resulting from the condensation, in an acidic medium, of a terpene and a phenol;

(f) aliphatic petroleum hydrocarbon resins having Ring and Ball softening points of from about 60° C. to 140° C., the latter resins resulting from the polymerization of monomers consisting primarily of olefins and diolefins; also included are the hydrogenated aliphatic petroleum hydrocarbon resins; examples of such commercially available resins based on a $C_5$-olefin fraction of this type are "Wingtack 95" and "Wingtack 115" tackifying resins sold by Goodyear Tire and Rubber Company;

(g) aromatic petroleum hydrocarbons and the hydrogenated derivatives thereof; or (h) aliphatic/aromatic petroleum derived hydrocarbons and the hydrogenated derivatives thereof.

Mixtures of two or more of the above described tackifying resins is also contemplated within the scope of this invention.

Preferred tackifying resins are the commercially available resins of Regalite R91, R101, R125 and S260, Reglite V1100, Escorez 1310 and 5380, Wingtack 95, Foral 85 and 105, Piccolyte A115, S115 and S10 and Piccotac 95E.

An especially preferred tackifying resin is the rosin ester of glycerol and abietic acid, commercially available from Hercules Incorporated as Foral® 85.

In order to prepare component (A), sub-components (A) (1), (A)(2) and (A)(3) are blended together to effect solution.

The sub-components are stirred while applying a necessary amount of heat. For each part of (A)(1), there is generally from 0.5–8 parts of (A)(2) and from 0.5–5 parts of (A)(3), preferably from 1–5 parts of (A)(2) and from 1–4 parts of (A)(3), and most preferably from 2–4 parts of (A)(2) and from 2–3 parts of (A)(3).

(B) The Dispersing Agent

The dispersing agent (B) comprises metal alkyl sulfates, silanes, titanates, zirconates or aluminates. The metal for the metal alkyl sulfates are the Group I metals and comprise lithium, sodium and potassium. Preferred is a sodium alkyl sulfate. The alkyl group for the metal alkyl sulfates contain from 4 to 24 carbon atoms, preferably from 6 to 20 carbon atoms and most preferably from 8 to 18 carbon atoms. As most preferred alkyl groups, examples are capryl, lauryl, myristyl, palmityl and stearyl. A preferred titanate is isopropyl tristearoyl titanate available from Kenrich as KR TTS.

The dispersing agent facilitates the incorporation of the thermally conductive filler (C) into the viscoelastic composition (A).

(C) The Thermally Conductive Filler

To improve the efficiency of heat transfer through the viscoelastic composition (A), a thermally conductive filler (C) is incorporated therein. The thermally conductive filler is analogous to the placement of rocks in a shallow stream that facilitates a person in crossing the stream.

Materials having utility as a thermally conductive filler comprise zinc oxide, boron nitride, aluminum nitride silicon carbide, silicon nitride, or mixtures thereof. A preferred thermally conductive filler is zinc oxide.

The particle size of the thermally conductive filler may vary widely. Best results are usually achieved with particles having diameters within the range of about 5 microns to about 20 microns, and preferably about 10 microns. The amount of this filler dispersed throughout the resin can also vary, depending on the heat output of the circuit and the materials and dimensions of the package components. For each part of (A), from 0.3–4.0 parts of (C) are employed. In a most preferred embodiment, for each part of (A), from 0.9–1.8 parts of (C) are employed. Regarding (B) and (C), for 1 part of (B), generally employed is from 80 to 120 parts, preferably from 90 to 110 parts and most preferably from 99 to 101 parts of (C).

In preparing the thermal interface compositions of this invention comprising components (A), (B) and (C), the sub components of (A), namely (A)(1), (A)(2) and (A)(3) may be combined together in any order to form (A), with (A) then being added to (B) and (C) or (B) and (C) in any order may be added to (A) in the presence or absence of suitable solvents. Additionally the (A) sub components, (B) and (C) may all be combined and mixed together in the presence or absence of suitable solvents. Regardless of the method used, suitable heat is added to effect proper mixing.

In the below Table I of the examples, mixing is accomplished by adding all of the ingredients together and mixing with a high shear mixer until homogeneous. In the examples 200 gram samples are prepared. The prepared samples are then coated onto 2 mil polyethyleneterephthate silicone coated liners. These coated samples are then dried at room temperature (about 72° F.) for 10 minutes and then at 350° F. for 2 minutes. In Table I, preparation of examples, the values of the various components are expressed in parts by weight.

TABLE I

| Component\Example | 1 | 2 | 3 | 4 | 5 | 6 | 7 | 8 |
|---|---|---|---|---|---|---|---|---|
| (A)(1) Kraton 1652 | 5.56 | 4.44 | 5.26 | 5.26 | 5.56 | 4.88 | 4.98 | 4.26 |
| (A)(2) Shellflex 371 | 33.33 | 26.67 | 34.21 | 31.58 | 33.33 | 29.27 | 24.88 | 25.53 |
| (A)(3) Reglite V1100 | 11.11 | 8.89 | 10.53 | 13.16 | 11.11 | 4.88 | 9.95 | 8.51 |
| (B) Kenrich KR TTS | 0.5 | 0.6 | 0.5 | 0.6 | 0.5 | 0.6 | .06 | 0.6 |
| (C) ZnO | 50.00 | 60.00 | 50.00 | 50.00 | | 60.98 | 59.70 | 57.45 |
| (C) BN | | | | | 50.00 | | | |

Table II compares examples of the instant invention to competitive examples 1–3. Samples of the instant invention and of the competitive examples are assembled on an electronic device between a heat source and a heat sink. The device is powered up and the temperature of the heat source (Ta) and the temperature of the heat sink (Tb) are measured. The difference between Ta and Tb is expressed as Delta T ($\Delta T$). The lower the $\Delta T$, the better the performance of the sample as a thermal interface material in transferring heat from the heat source to the heat sink.

TABLE II

| Sample | Source | Ta (° F.) | Tb (° F.) | $\Delta T$ (F. °) |
|---|---|---|---|---|
| 1 | Example 1 | 52 | 45 | 7 |
| 2 | Example 2 | 55 | 45 | 10 |
| 3 | Example 3 | 52 | 45 | 7 |
| 4 | Example 4 | 52 | 45 | 7 |
| 5 | Example 5 | 52 | 45 | 7 |
| 6 | Example 6 | 55 | 45 | 10 |
| 7 | Example 7 | 55 | 45 | 10 |
| 8 | Example 8 | 54 | 45 | 9 |
| 9 | Competitive 1 | 61 | 45 | 16 |
| 10 | Competitive 3 | 61 | 45 | 16 |
| 11 | Competitive 4 | 58 | 45 | 13 |

As can be observed from Table II, the $\Delta T$ of the samples of the instant invention are lower than the samples of the competitive examples, showing that the instant examples are much better in the transfer of heat from a heat source to a heat sink. At room temperature the composition in accordance with the present invention is a physically cross-linked polymer. When the melting temperature of the composition is reached as the heat source temperature rises, the elastomer component essentially dissolves in the oil, thereby undergoing a change of state to a liquid form. The resulting solution is capable of wetting both the device and heat sink surfaces to thereby establish a highly thermally conductive path between them.

While the invention has been explained in relation to its preferred embodiments, it is to be understood that various modifications thereof will become apparent to those skilled in the art upon reading the present description. For example, for the preferred embodiments the elastomer and oil compatible with it are hydrocarbon-based. However, other combinations, such as a silicone elastomer and a silicone oil compatible with it are also candidates for making use of the invention. For example, a phenyl silicone elastomer end-capped with a dimethyl silicone MQ resin may result in a structure in which the resins form hard, crystalline domains around the soft, extensible elastomer because the elastomer and resin are somewhat incompatible with each other. However, both the elastomer and resin are soluble in silicone oil, especially at elevated temperatures. The "MQ" designation referred to above is familiar to those in the art and refers to a combination of two forms of a silicone. A silicone with 4 oxygens is designated as "Q". It is actually silicone dioxide, also known as quartz. A silicone with 1 oxygen and 3 organic substitutes is designated as "M". When combined, the two forms make a highly branched MQ resin. The organic substitutions can vary, but are normally methyl groups, such as the dimethyl silicone also referred to above. Therefore, it is to be understood that the invention disclosed herein is intended to cover such modifications as fall within the scope of the appended claims.

What is claimed is:

1. A thermal interface composition which undergoes a viscoelastic change at microprocessor operating temperatures to transfer heat generated by a heat source to a heat sink, the composition comprising:
    (A) a viscoelastic composition which melts at a temperature within the range of the operating temperature of the heat source, the viscoelastic composition comprising:
        (1) a thermoplastic elastomer,
        (2) an oil compatible with the elastomer, and
        (3) a tackifying resin;
    (B) a dispersing agent, and
    (C) a thermally conductive filler dispersed within the viscoelastic composition.

2. The composition of claim 1 wherein the thermoplastic elastomer is a styrene-alkylene-styrene triblock copolymer.

3. The composition of claim 2 wherein the alkylene comprises ethylene, propylene, 1-butene, 2-butene, isobutylene, butadiene, isoprene or mixtures thereof.

4. The composition of claim 1 wherein the thermoplastic elastomer is a poly(styrene-butadiene-styrene) triblock copolymer.

5. The composition of claim 1 wherein the thermoplastic elastomer is a poly(styrene-ethylene-butylene-styrene) triblock copolymer.

6. The composition of claim 1 wherein the thermoplastic elastomer is a poly(styrene-isoprene-styrene) triblock copolymer.

7. The composition of claim 5 wherein the weight ratio of styrene end block to ethylene-butylene center block of the triblock polymer is from 10:90 to 40:60.

8. The composition of claim 5 wherein the weight ratio of styrene end block to ethylene-butylene center block of the triblock polymer is from 20:80 to 35:65.

9. The composition of claim 5 wherein the weight ratio of styrene end block to ethylene-butylene center block of the triblock polymer is from 25:75 to 30:70.

10. The composition of claim 1 wherein the hydrocarbon oil comprises a mineral oil, a polyalphaolefin, a synthetic oil, or mixtures thereof.

11. The composition of claim 10 wherein the mineral oil comprises a paraffinic oil, a naphthenic oil, an aromatic oil or mixtures thereof.

12. The composition of claim 12 wherein the ratio of paraffinic oil to alkylated benzene is from 30–70:70–30.

13. The composition of claim 12 wherein the ratio of paraffinic oil to alkylated benzene is from 40–60:60–40.

14. The composition of claim 1 wherein the tackifying resin comprises natural and modified rosin, glycerol and pentaerythritol esters of natural and modified rosins, polyterpene resins, copolymers and terpolymers of natural terpenes, phenolic-modified terpene resins, aliphatic petroleum hydrocarbon resins, aromatic petroleum hydrocarbons and the hydrogenated derivatives thereof, aliphatic or aromatic petroleum derived hydrocarbons and the hydrogenated derivatives thereof or mixtures thereof.

15. The composition of claim 14 wherein the tackifying resin is a rosin ester of glycerol and abietic acid.

16. The composition of claim 1 wherein the dispersing agent comprises metal alkyl sulfates, silanes, titanates, zirconates or aluminates.

17. The composition of claim 1 wherein the thermally conductive filler comprises zinc oxide, boron nitride, aluminum nitride, silicon carbide, silicon nitride, or mixtures thereof.

18. The composition of claim 1 wherein the thermally conductive filler comprises zinc oxide.

19. The composition of claim 1 wherein for each part of (A)(1) there is present from 0.5–8 parts of (A)(2) and 0.5–5 parts of (A)(3).

20. The composition of claim 1 where the weight ratio of (A):(C) is from 1:0.3–4.0.

21. The composition of claim 1 where the weight ratio of (A):(C) is from 1:0.9–1.8.

22. The composition of claim 1 wherein the weight ratio of (B):(C) is from 1:90–99.5.

23. A method for preparing a thermal interface composition which undergoes a viscoelastic change at microprocessor operating temperatures to transfer heat generated by a heat source to a heat sink, the composition comprising combining
    (A) a viscoelastic composition which softens at about the operating temperature of the heat source, the viscoelastic composition comprising:
        (1) a thermoplastic elastomer,
        (2) a compatible hydrocarbon oil, and
        (3) a tackifying resin; with
    (B) a dispersing agent; and
    (C) a thermally conductive filler
wherein (C) is dispersed within (A).

* * * * *